United States Patent
Rose et al.

(10) Patent No.: US 6,714,910 B1
(45) Date of Patent: Mar. 30, 2004

(54) METHOD OF TRAINING AN AUTOMATIC SPEECH RECOGNIZER

(75) Inventors: Georg Rose, Dusseldorf (DE); Joseph Hubertus Eggen, Eindhoven (NL); Bartel Marinus Van Der Sluis, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 575 days.

(21) Appl. No.: 09/603,923

(22) Filed: Jun. 26, 2000

(30) Foreign Application Priority Data

Jun. 26, 1999 (DE) .......................................... 199 29 462

(51) Int. Cl.7 ............................................. G10L 15/14
(52) U.S. Cl. ...................... 704/256; 704/270; 704/231; 704/241
(58) Field of Search ................................ 704/256, 231, 704/251, 244, 240, 239, 243, 232, 247, 253, 273, 270

(56) References Cited

U.S. PATENT DOCUMENTS

| | | | | |
|---|---|---|---|---|
| 5,025,471 A | * | 6/1991 | Scott et al. .................. 704/237 |
| 5,502,774 A | * | 3/1996 | Bellegarda et al. ......... 382/159 |
| 5,675,706 A | * | 10/1997 | Lee et al. .................... 704/256 |
| 5,710,864 A | * | 1/1998 | Juang et al. ................. 704/238 |
| 5,710,866 A | * | 1/1998 | Alleva et al. ................ 704/256 |
| 5,812,972 A | * | 9/1998 | Juang et al. ................. 704/234 |
| 5,832,063 A | * | 11/1998 | Vysotsky et al. ......... 379/88.03 |
| 5,832,430 A | * | 11/1998 | Lleida et al. ................ 704/256 |
| 5,857,173 A | * | 1/1999 | Beard et al. ................. 704/276 |
| 5,893,064 A | * | 4/1999 | Kudirka et al. .......... 704/270.1 |
| 6,015,344 A | * | 1/2000 | Kelly et al. .................... 463/16 |
| 6,085,160 A | * | 7/2000 | D'hoore et al. ............. 704/256 |
| 6,125,345 A | * | 9/2000 | Modi et al. .................. 704/240 |
| 6,226,612 B1 | * | 5/2001 | Srenger et al. ............. 704/256 |
| 6,374,221 B1 | * | 4/2002 | Haimi-Cohen .............. 704/256 |

OTHER PUBLICATIONS

By D. Langmann et al. "Robust Rejection Modeling for a Small–Vocabulary Application" ITG–Fachtagung Sprachkommunikation, Frankfurt am Main, Sep. 17/18, 1996. PP 55–17.

By J.G.A. Dolfing et al. "Combination of Confidence Measures in Isolated Word Recognition" ICSLP 1998, pp. S.5–S.8.

* cited by examiner

Primary Examiner—Vijay Chawan

(57) ABSTRACT

Provided is a method of training an automatic speech recognizer, said speech recognizer using acoustic models and/or speech models, wherein speech data is collected during a training phase and used to improve the acoustic models, said method comprising: during the training phase, providing speech utterances that are predefined to a user by means of a game, wherein the game has predefined rules to enable a user to provide certain utterances; and providing the utterances by the user for training the speech recognizer.

7 Claims, 1 Drawing Sheet

METHOD OF TRAINING AN AUTOMATIC SPEECH RECOGNIZER

BACKGROUND OF THE INVENTION

The invention relates to a method of training an automatic speech recognizer.

Automatic speech recognizers are based, on the one hand, on acoustic models and, on the other hand, also on speech models—as is customary with speaker-independent dictating systems. For acoustic modeling, so-called HMM (Hidden Markov Models) are normally used, whose model parameters can be determined for the respective application. For example, special transition probabilities and output probability functions can be determined for each HMM. The HMM parameters are normally initialized in a training phase prior to the actual speech recognition being taken into operation. Speech data which are input during the speech mode are then frequently used for adapting the speech recognizer, more particularly to a certain speaker or to certain background noises, to further improve the acoustic models.

In the training phase of a speech recognizer, a user is requested by the speech recognition system to input predefined speech utterances which, for example, are to be pronounced several times when a speaker-independent speech recognizer is used. The inputted speech utterances are evaluated and the associated HMM is determined accordingly. The training phase usually lasts a rather long period of time, may last several hours, and is often experienced by the user as annoying, boring and/or tiring.

SUMMARY OF THE INVENTION

It is an object of the invention to provide a more pleasant training for the user.

The object is achieved in that, during the training, speech utterances are presented to a user by means of a game, which utterances are provided for training the speech recognizer.

A game considered as such represents an amusing activity according to certain rules, which amusing activity is basically the result of the fact that people enjoy it (pastime, entertainment). By incorporating a game with a speech recognizer training, the user is, on the one hand, entertained and, in parallel therewith, speech inputs of a user are processed which are automatically used for models (particularly HMM models) implemented in the speech recognizer. In the respective phases of the game, the user is presented with speech utterances i.e. words, word components and word combinations especially by visually displaying them, in order to make the user actually produce the speech utterances predefined for him and enter them in the speech recognition system. Basically, it is alternatively possible for the user to be requested by acoustic signals (instead of visually displayed signals) to enter certain speech utterances.

In an embodiment of the invention, there is provided that the user is shown at least a first speech utterance to which the speech recognizer has already been trained, and that the user is furthermore shown a further speech utterance to which the speech recognizer is still to be trained. This is an advantageous method especially for speaker-dependent speech recognizers with a small vocabulary. The number of trained words is successively (word for word) enlarged here. The speech recognizer then recognizes an entered speech utterance either as an already trained word or as an unknown word, which is still to be trained during the respective game period. For the word to be trained, both the optimum number of HMM states and the associated HMM parameters can be determined. In this respect, a variant of the invention proposes that the speech utterances predefined for the user are marks for assigned picture screen areas, which marks are shifted over the picture screen when the respective speech utterance is entered, so as to generate as a target a predefinable structure on the picture screen, which is shown anew after the target has been achieved.

Another embodiment of the invention implies that when a speech utterance to which the speech recognizer has already been trained is inputted, the speech recognizer is adapted by means of this speech input. So doing, also a user's speech inputs relating to an already trained speech utterance are utilized, that is, for further improvement of associated HMM models for which parameter values have already been determined during a training phase.

Furthermore, the invention may be expanded in this respect in that the classification of a speech input as a speech input to be used for the training depends on a degree of confidence which indicates a measure that the speech utterance entered by the user corresponds to a speech utterance predefined by the speech recognizer. In this way it can be avoided that a training is performed based on acoustic signals received by the speech recognizer during the training phase, which acoustic signals are not deemed eligible for speech inputs suitable for the training. For example, in this way it can be avoided that background noise (for example, the opening or closing of a door) is used for training the speech recognizer, Instead of an evaluation with confidence measures, in another variant of embodiment an evaluation by means of a so-called garbage modeling can be used. For this purpose, reference is made to the article "Robust Rejection Modeling for a Small-Vocabulary Application", D. Langmann, R. Haeb-Umbach, T. Eisele, S. Gamm Proc. ITG-Fachtagung Sprachkommunikation, Frankfurt am Main, 17/18 September 1996.

The invention also relates to a method of adapting an automatic speech recognizer to a speaker in which speech utterances are presented to a user by means of a game, which speech utterances are provided for adapting the speech recognizer to the user. The speaker adaptation is particularly provided for speaker-independent speech recognition systems such as, for example, dictating systems. The variants of embodiment mentioned above with respect to a training of a speech recognizer can accordingly be used for speaker adaptation.

The invention also relates to a speech recognition system for implementing one of the methods described above and an electrical device, more particularly a home entertainment device including a speech recognition system arranged in this manner.

BRIEF DESCRIPTION OF THE DRAWINGS

Examples of embodiment of the invention will be further explained hereinafter with reference to the drawings, in which.

DETAILED DESCRIPTION OF THE INVENTION

Figure 1:
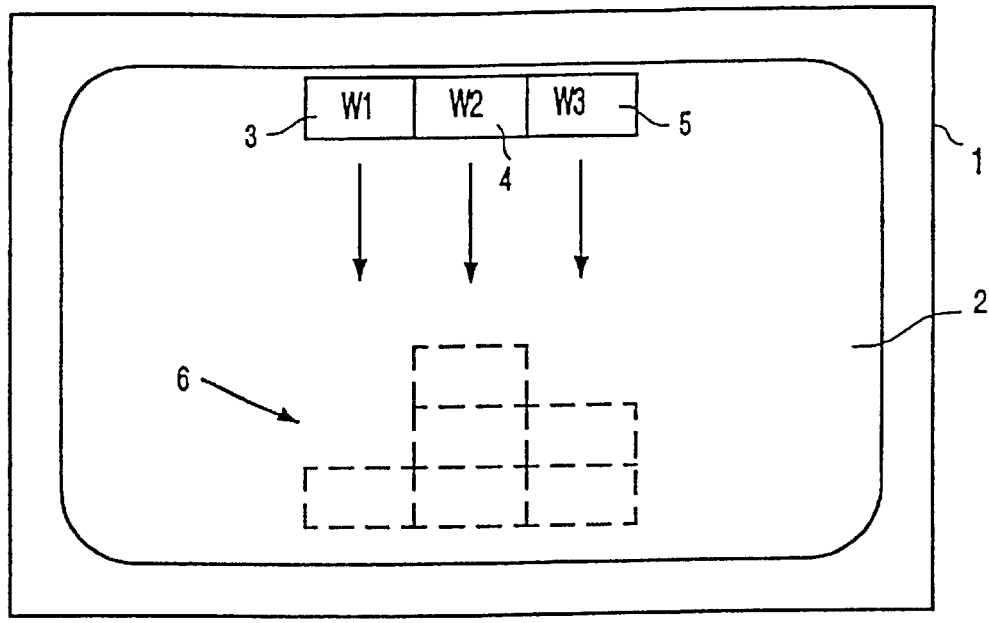
FIG. 1 shows a device with a speech recognition system according to the invention.

The electrical device shown in FIG. 1, here a device from the range of home entertainment products such as, for example, a television set, includes a speaker-dependent automatic speech recognizer arranged in customary fashion and not further shown, with the aid of which functions of the device 1 can be controlled by speech inputs. With a television set, for example the videotext function could be supported. Another application is, for example, the programming of the video recorder. In order to make the speech recognition system inserted into the electrical device ready for operation, a speech recognition training is to be performed, as is known. To carry out the training, speech utterances, here the words W1, W2 and W3 are presented to a user during a training phase, which utterances are provided for the training procedure of the speech recognizer used. In the present case, the words W1 and W2 represent words to which the speech recognizer has already been trained. On the other hand, the speech recognizer is still to train the word W3 during this training phase i.e. speech inputs from the respective user with respect to the word W3 are still necessary for determining the appropriate HMM parameter values and here also the necessary number of HMM states. With the computer game used here for the training, the displayed words W1, W2 and W3 serve as marks for associated picture screen areas 3, 4 and 5. If the user pronounces the word W1, or the word W2 i.e. if he makes respective speech inputs, and if these are then recognized by the speech recognizer used in the electrical device 1, this will cause the associated picture screen areas to be shifted from the upper edge of the picture screen 2 to the opposite lower edge of the picture screen 2. A multiple recognition of a predefined word causes the associated picture screen areas to become visible in a respective number lying side by side (overlapping here) on the lower edge of the picture screen 2; the picture screen areas are stacked for the time being as the stack still remains within the limits of the predefined structure. If the speech recognizer detects a speech input and if this speech input is not recognized as word W1 or word W2, this speech input will be interpreted by the speech recognizer as an input of word W3, be it that the speech input is considered unsuitable for training, for which purpose in the present case an evaluation is used by means of a confidence measure. A suitable confidence measure may be taken, for example, from the article "Combination of Confidence Measures in Isolated Word Recognition", J. G. A. Dolfing, A. Wendemutt, ICSLP 1998. The aim of the game in the present case is to generate a predefinable structure on the picture screen 2, which is predefined anew when the aim is achieved. An example for such a structure is drawn in a broken line on the lower edge of the picture screen 2 in FIG. 1 (reference 6). If a sufficient number of speech inputs were made with respect to the word W3 to be trained (possibly after repeatedly renewed determination of a structure to be formed on the picture screen), the HMM belonging to the word W3 is estimated on the basis of this, i.e. the HMM model structure and the set of parameter values belonging thereto are determined.

The training carried out here first begins with the training of a first word which preferably represents the user's name. The user is requested to enter his name via a keyboard and subsequently enter his name several times as speech input in the system to train a first word on the basis of this. As an alternative, the first word to be trained could also be started as a speaker-independent word with associated HMM modeling. After the training of a first word, the vocabulary of trained words may then be structured successively.

Figure 2:
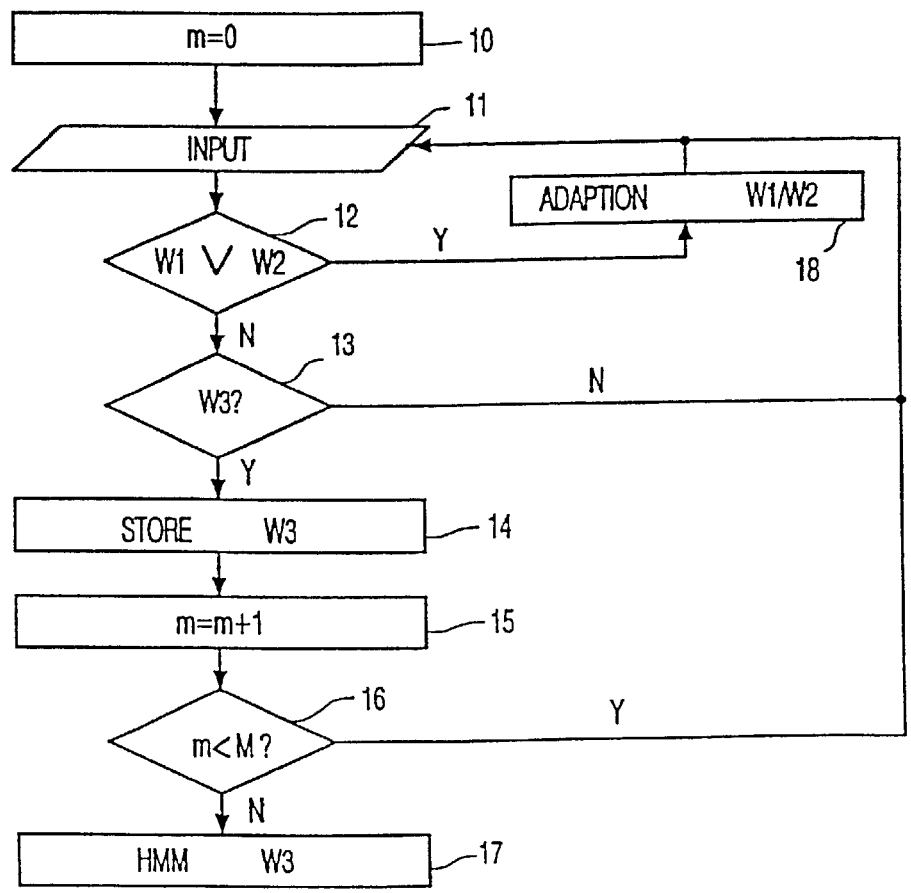
FIG. 2 shows a flow chart describing the training of the speech recognizer according to the invention.

The pattern of the training will now be further explained with reference to the flow chart in FIG. 2. After the start of the training with respect to word W3, where a variable m is set to zero (step 10), step 11 is proceeded with in which the user inputs a speech utterance. If in step 12 the speech input is recognized as word W1 or as word W2, an adaptation (step 18) is made of the respective HMM which, however, is optional. Subsequently, the training is continued with step 11. If in step 12 the inputted speech utterance is not recognized as word W1 or word W2, in step 13 an estimation is made on the basis of a confidence measure value whether the speech input is eligible for an input of the word W3. If this is not the case, step 11 follows, if this is the case, the respective feature values determined for the speech input and belonging to the word W3 are stored. Subsequently, the variable m is incremented by the value 1 (step 15) which is followed by step 16 in which the query whether the value of the variable m is smaller than a predefinable number M, which indicates the necessary number of speech inputs for the word W3 to be trained. If the value of m in step 16 is smaller than M, step 11 joins in. Alternatively, the feature values stored in step 14 are used for estimating the HMM belonging to the word W3 in step 17. M preferably lies in the range from 3 to 5, so that on condition that there is a structure 6 to be formed, such as shown in FIG. 1, after the structure has been achieved, a further play phase with a new play target is necessary for performing a HMM estimate with respect to the word W3.

The described training method also particularly relates to small-vocabulary speaker-dependent speech recognition systems. A (computer) game, however, may also be used within the scope of the voice adaptation (adaptation to a specific speaker) of speaker-independent systems with a large vocabulary i.e. for example, in dictating systems. Already trained HMMs are then adapted to a specific speaker by modifying respective HMM parameters. The play version as shown in FIG. 1 could then be adapted insofar as that the speech recognizer has already been trained to all displayed words W1, W2 and W3 and that with respect to all these words a speaker adaptation is provided, as is shown in step 18 of FIG. 2.

What is claimed is:

1. A method of training an automatic speech recognizer, said speech recognizer using acoustic models and/or speech models, wherein speech data is collected during a training phase and used to improve the acoustic models, said method comprising:

during the training phase, providing speech utterances that are predefined to a user as marks for assigned picture screen areas;

providing the utterances by the user for training the speech recognizer;

shifting the marks on the picture screen when the associated speech utterance is made to produce as a target a predefinable structure on the picture screen; and redefining the mark after the target has been reached.

2. A method as claimed in claim 1, wherein the providing speech utterances step includes providing a first speech utterance that the speech recognizer has already been trained to the user and providing a second utterance that the speech recognizer has not been trained is shown to the user.

3. A method as claimed in claim 1, further including the step of when a speech utterance is made that the speech recognizer has already been trained adapting of the speech recognizer using the speech utterance.

4. A method as claimed in claim 1, wherein the classification of a speech input as a speech input to be used for the training depends on a confidence measure to be determined for this speech input, which confidence measure expresses the extend to which the speech utterance entered by the user corresponds to a speech utterance predefined by the speech recognizer during the training phase.

5. A speech recognition system for implementing a method as claimed in 1.

6. A method of speaker adaptation of an automatic speech recognizer, said speech recognizer using acoustic models and/or speech models, wherein speech data is collected and used to improve the acoustic models, said method comprising:

providing speech utterances that are predefined for a user as marks for assigned picture screen areas;

providing the utterances for adapting the speech recognizer to the user;

shifting the marks on the picture screen when the associated speech utterance is made to produce as a target a predefinable structure on the picture screen; and redefining the mark after the target has been reached.

7. An electrical device for use in a home entertainment product, the electrical device including a speech recognition system as claimed in claim 5.

* * * * *